J. F. APPLEBY.
GRAIN HARVESTER.
APPLICATION FILED SEPT. 26, 1914.

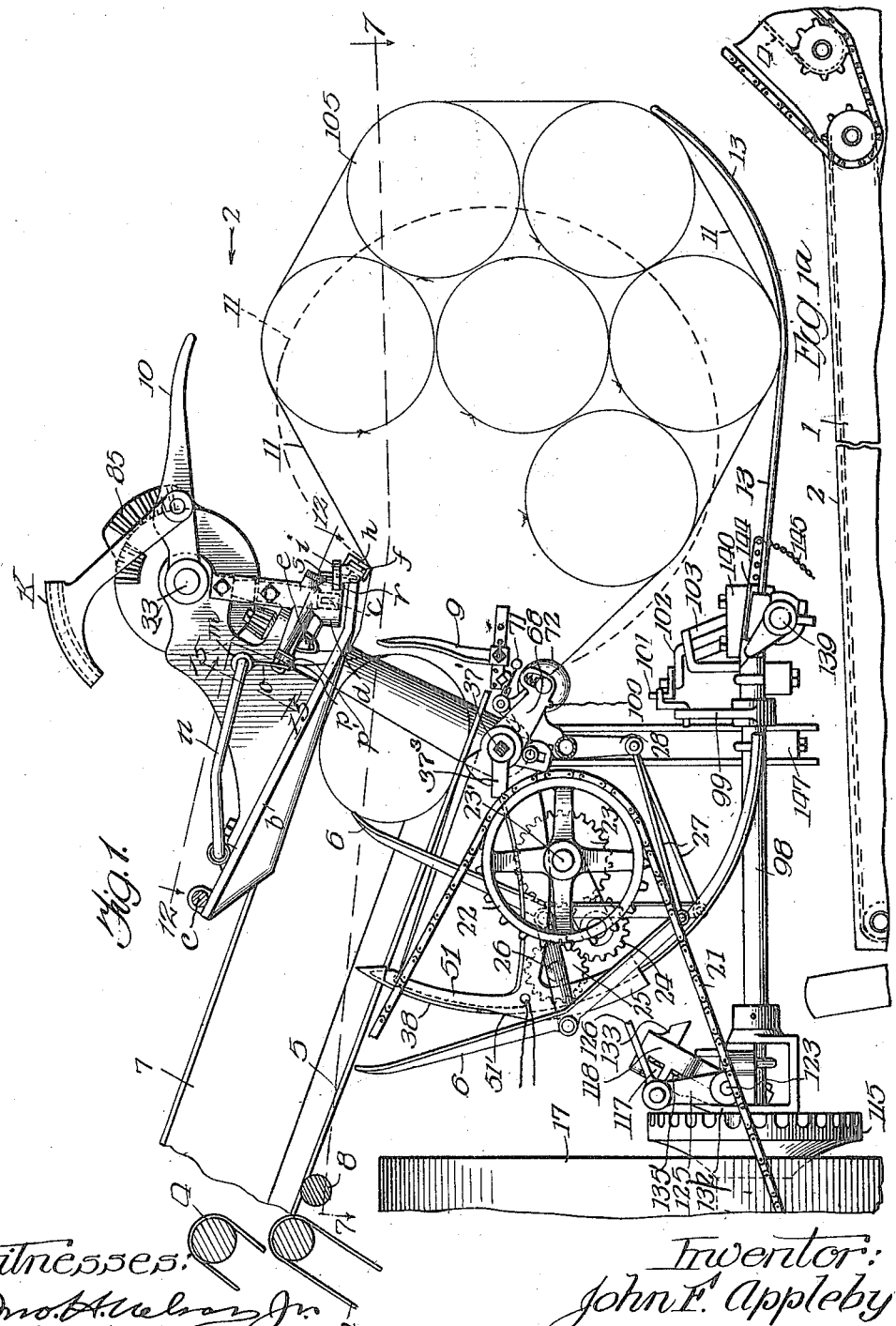

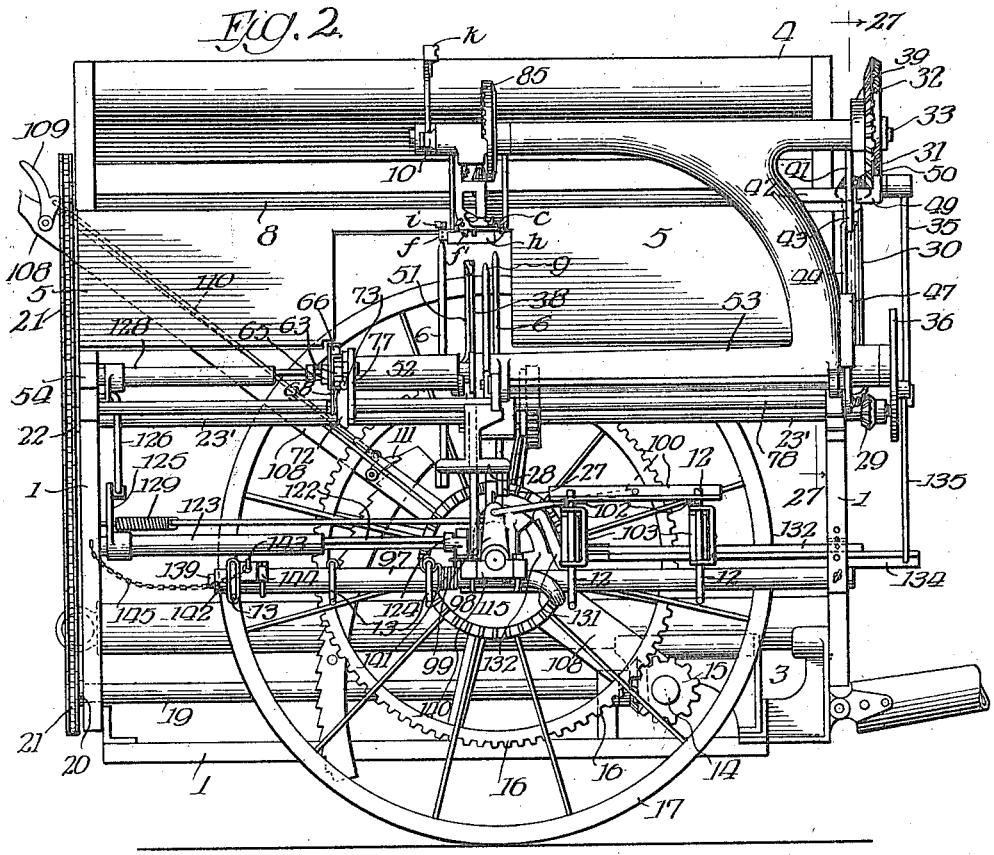

1,141,299.

Patented June 1, 1915.
8 SHEETS—SHEET 3.

Witnesses

Inventor
John F. Appleby
By G. L. Grogg
Atty.

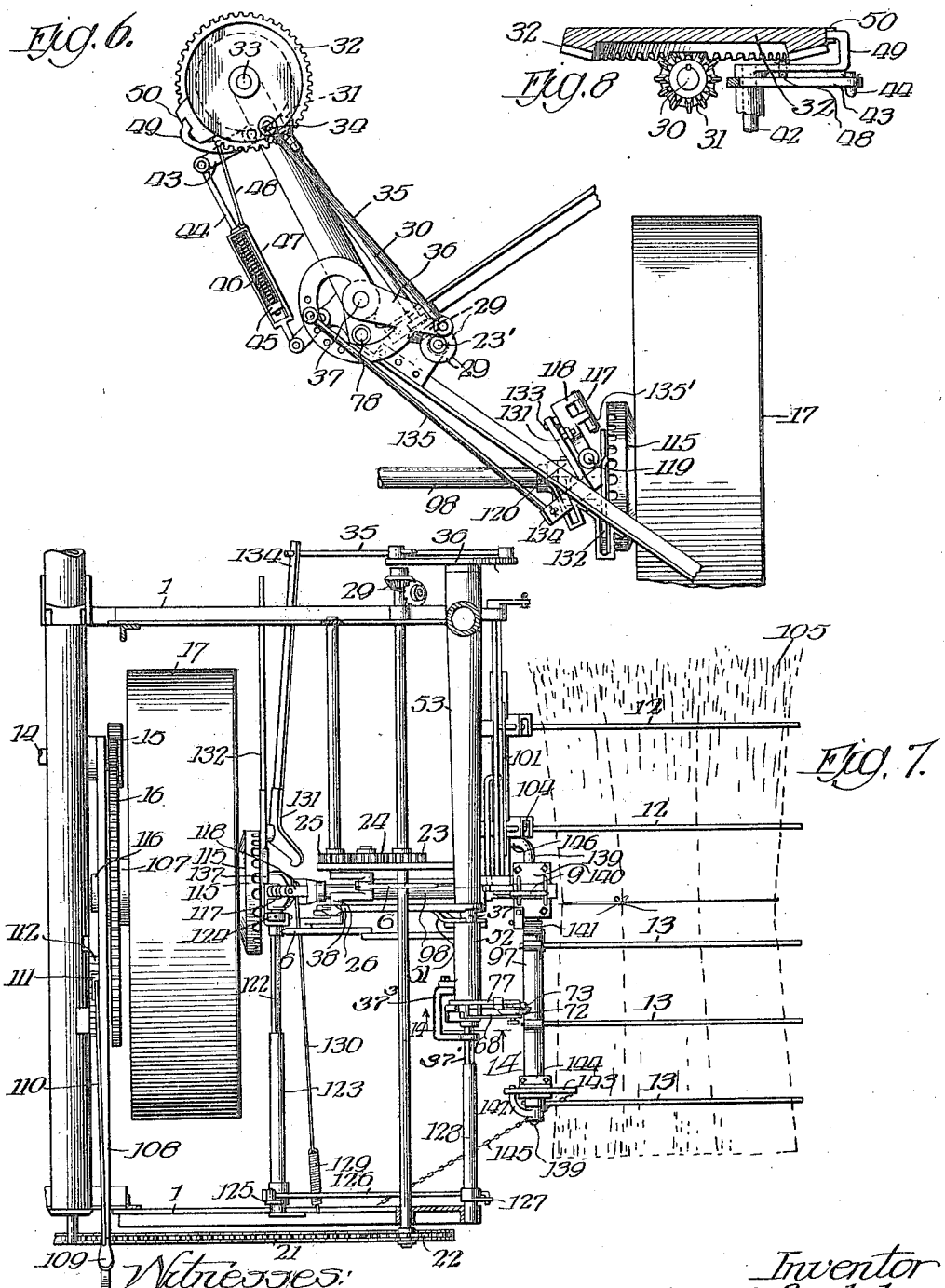

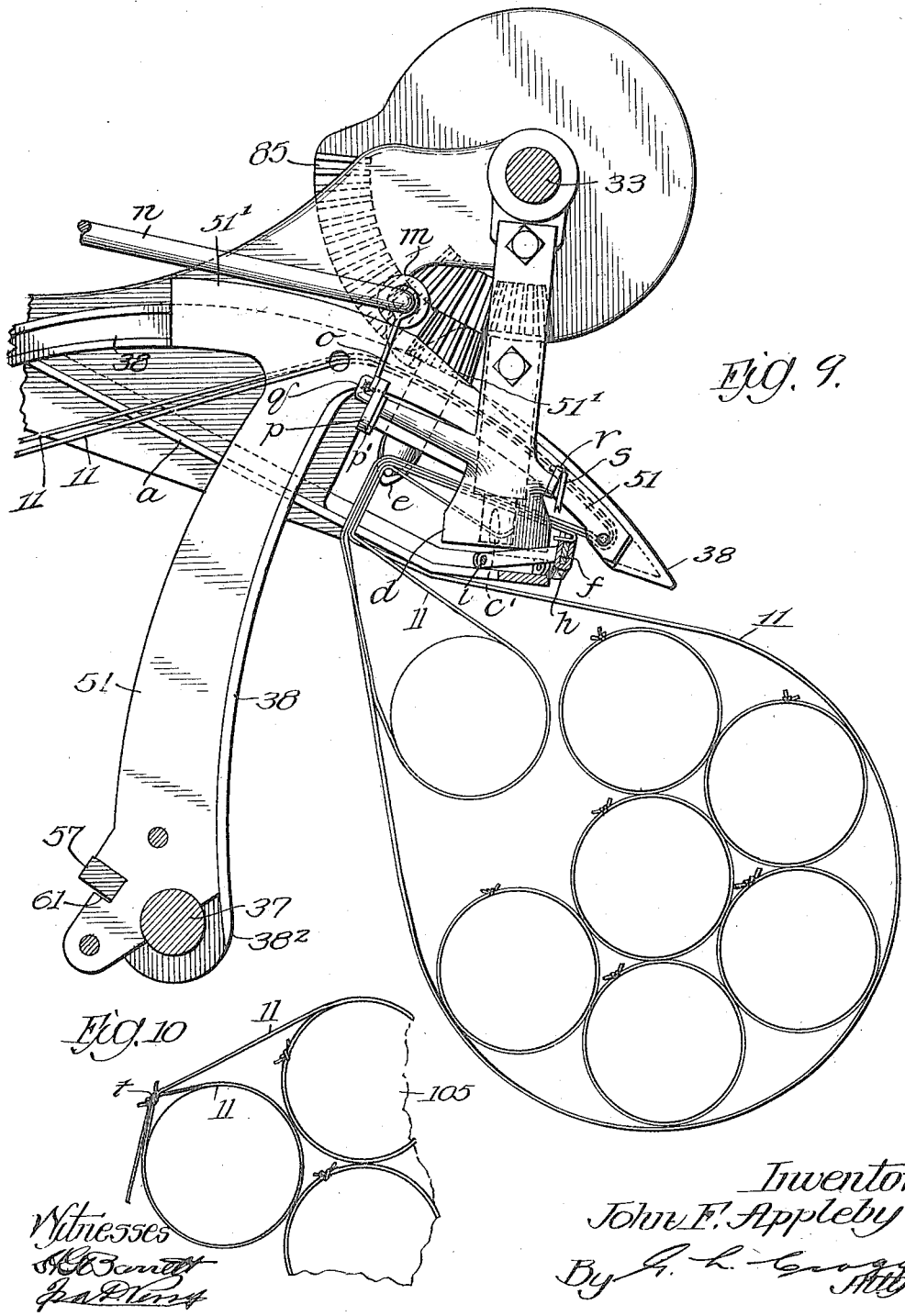

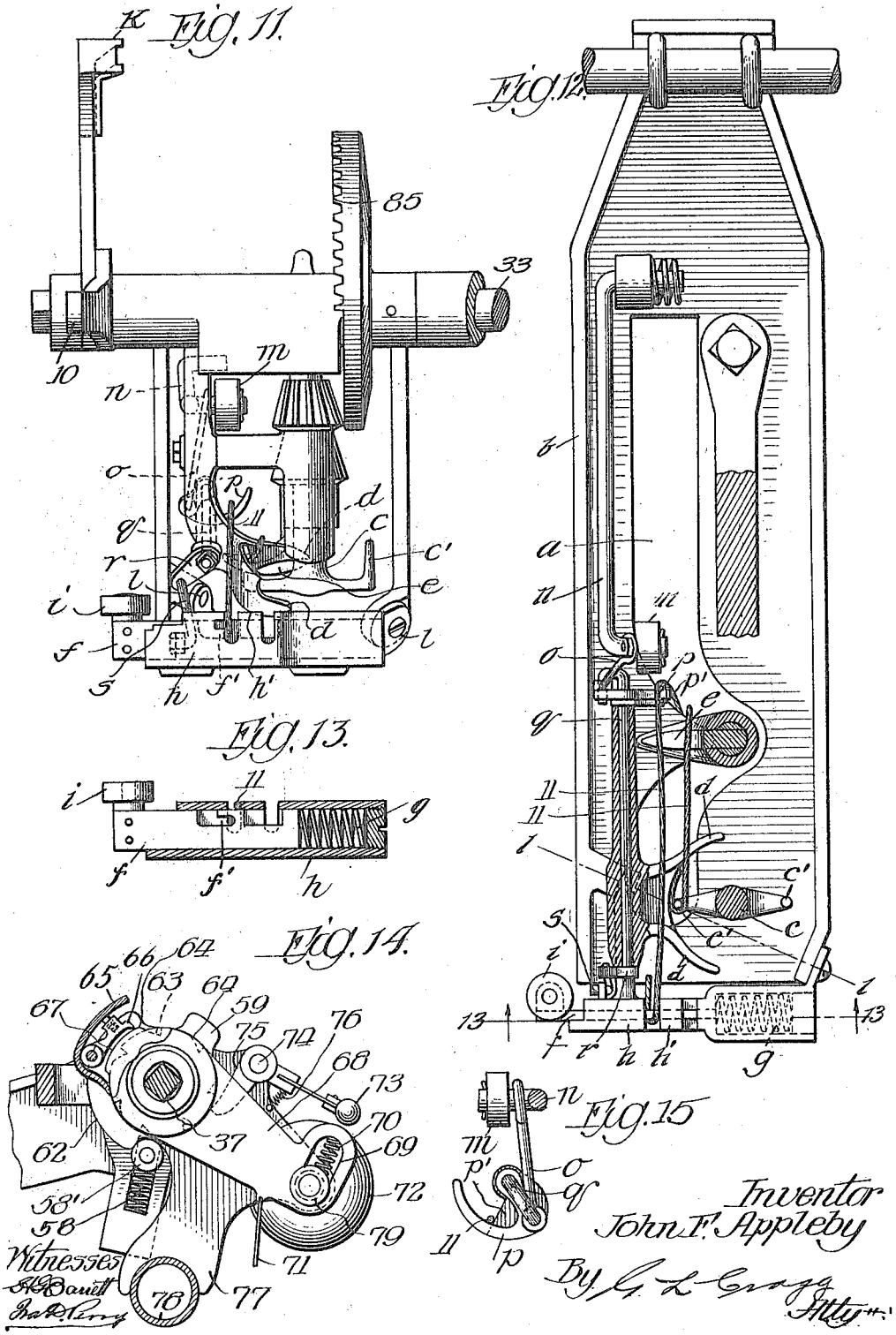

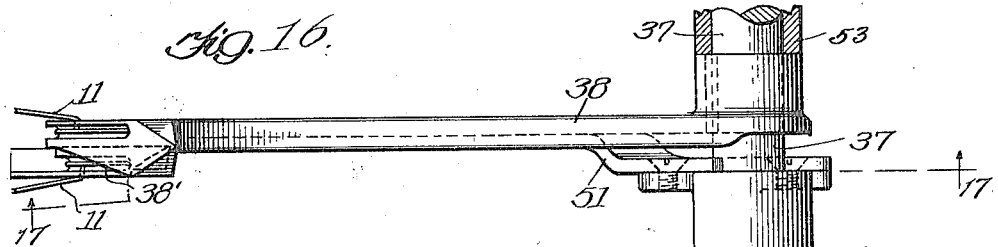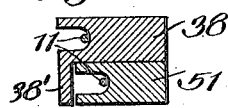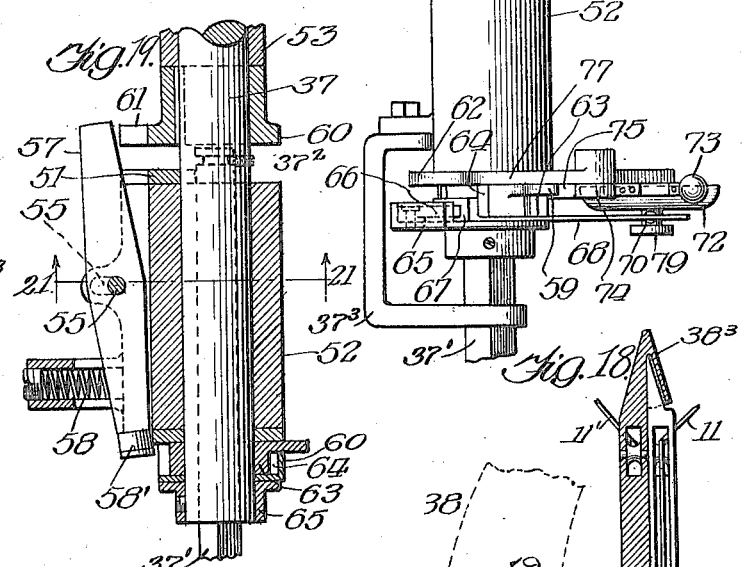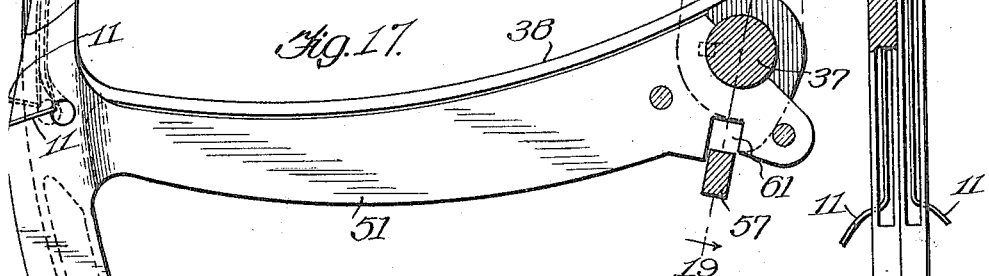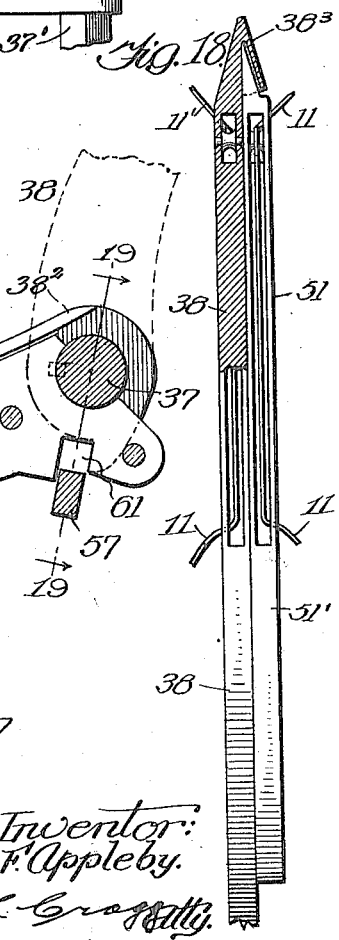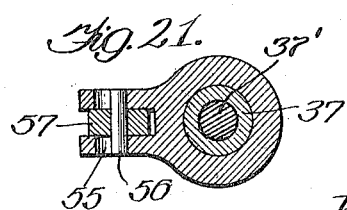

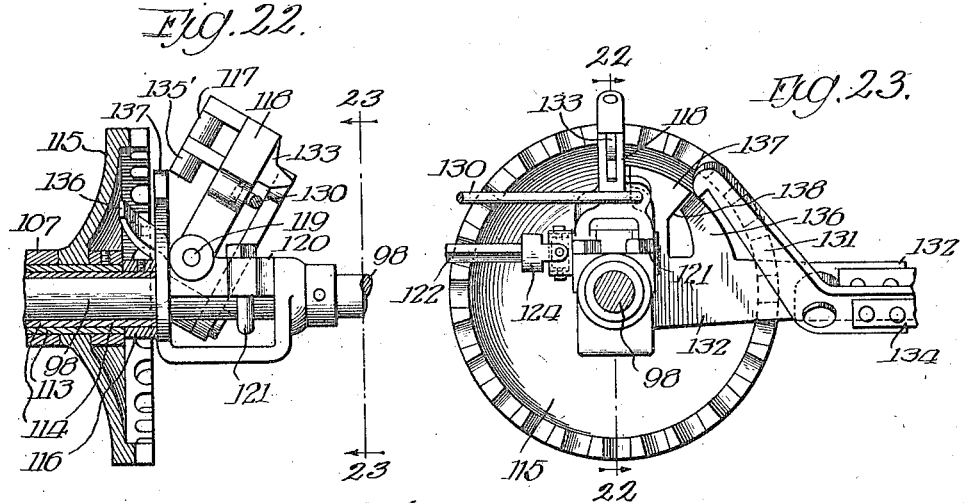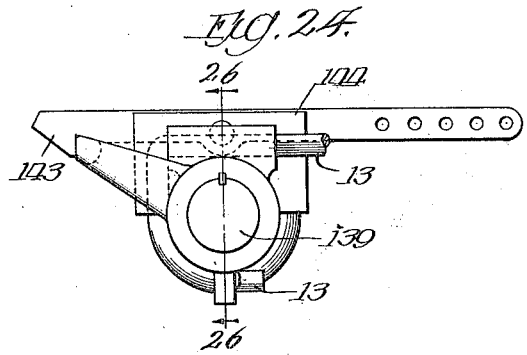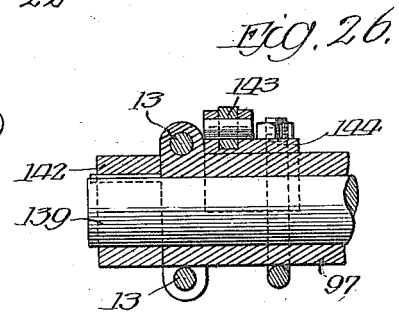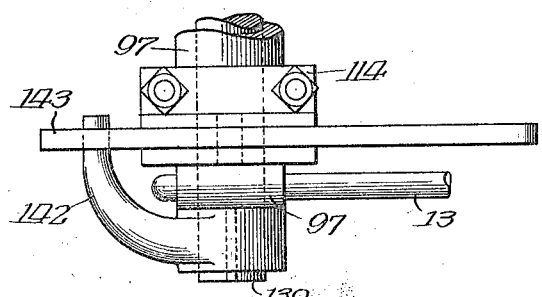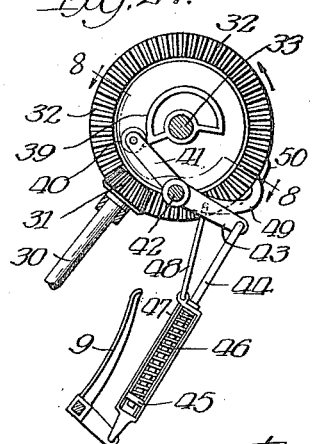

UNITED STATES PATENT OFFICE.

JOHN F. APPLEBY, OF PEORIA, ILLINOIS, ASSIGNOR OF ONE-HALF TO PETER D. MIDDLEKAUFF, OF CHICAGO, ILLINOIS.

GRAIN-HARVESTER.

1,141,299. Specification of Letters Patent. Patented June 1, 1915.

Application filed September 26, 1914. Serial No. 863,742.

*To all whom it may concern:*

Be it known that I, JOHN F. APPLEBY, citizen of the United States, residing at Peoria, in the county of Peoria and State of Illinois, have invented a certain new and useful Improvement in Grain-Harvesters, of which the following is a full, clear, concise, and exact description, reference being had to the accompanying drawings, forming a part of this specification.

My invention relates to grain harvesters and is of particular service in connection with the form of grain harvester shown in my copending application Serial No. 791,006, filed September 22, 1913, though the invention is not to be limited to its employment in any particular form of machine.

In the machine to which my invention is adapted means are preferably employed for depositing bound bundles of grain upright with the stub ends thereof upon the ground, a predetermined number of bundles being assembled in a shock before the grain is deposited.

In the apparatus of my present invention a novel needle structure is employed in the knotting of the bundle twine and the shock twine.

In the apparatus of my invention I also preferably employ knotting mechanism which is common to my novel needle structure, but I do not wish to be limited to the employment of either of these characteristics in connection with the other.

The advantages of my present invention and the various features thereof will be fully explained by reference to the accompanying drawings in which—

Figure 4:
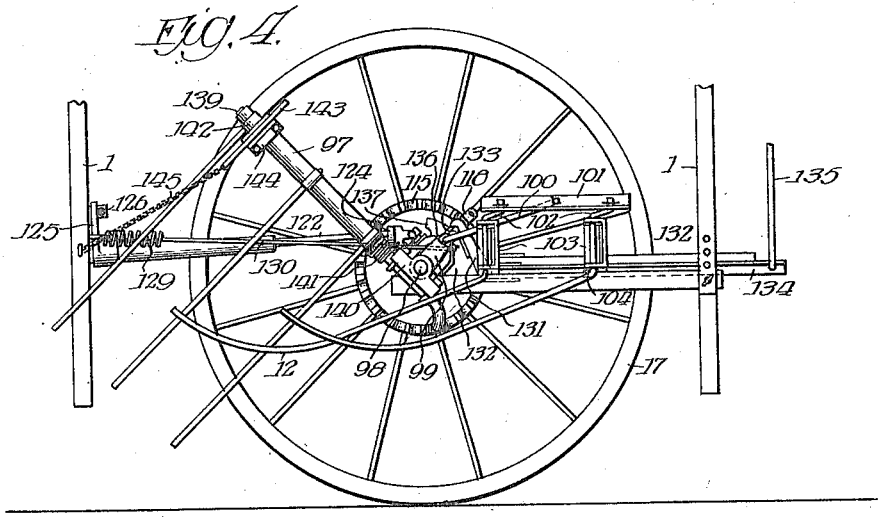
Figure 5:
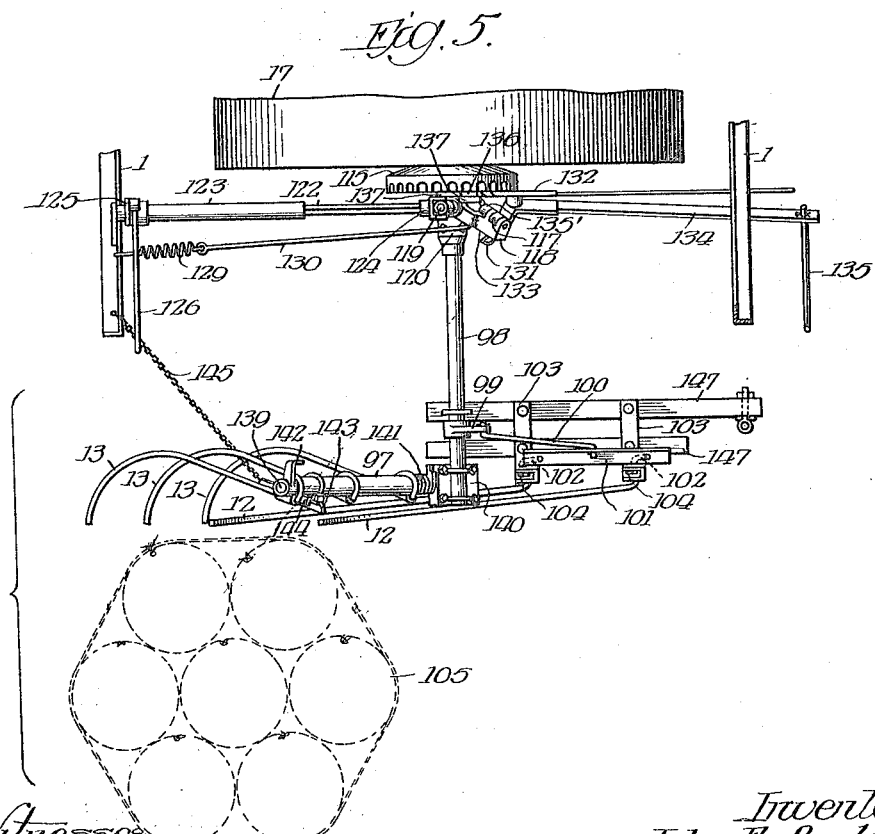

Figure 1 is an end view of a part of a machine equipped in accordance with my invention; Fig. 1ᵃ illustrates some of the construction; Fig. 2 is a side view of part of the construction; Fig. 3 is a perspective view illustrating a part of the knotting mechanism which is preferably employed; Fig. 4 is a side view illustrating other features of construction; Fig. 5 is a plan view of part of the structure; Fig. 6 is an end view of certain features of construction; Fig. 7 is a sectional view on line 7 7 of Fig. 1; Fig. 8 is a sectional view on line 8 8 of Fig. 27; Fig. 9 is a detail illustrating some of the knotting mechanism; Fig. 10 is a detail showing the knotted formations in the twine that binds the grain into bundles and the bundles into a shock; Fig. 11 is a view in elevation illustrating the knotting mechanism more completely; Fig. 12 is a view on line 12 12 of Fig. 1; Fig. 13 is a sectional view on line 13 13 of Fig. 12; Fig. 14 is a view on line 14 14 of Fig. 7; Fig. 15 is a sectional view on line 15 15 of Fig. 1; Fig. 16 is a view illustrating the needles and a part of the mechanism for controlling their operation; Fig. 17 is a view on line 17 17 of Fig. 16; Fig. 18 is a view on line 18 18 of Fig. 17; Fig. 19 is a sectional view on line 19 19 of Fig. 17; Fig. 20 is a sectional view on line 20 20 of Fig. 17; Fig. 21 is a view on line 21 21 of Fig. 19; Fig. 22 is a sectional view on line 22 22 of Fig. 23; Fig. 23 is a sectional view on line 23 23 of Fig. 22; Fig. 24 is a side view of the mechanism illustrated in Fig. 25; Fig. 25 is a plan view of the structure illustrated in Fig. 24; Fig. 26 is a view on line 26 26 of Fig. 24; and Fig. 27 is a sectional view generally taken on line 27 27 of Fig. 2.

Like parts are indicated by similar characters of reference throughout the different figures.

Many characteristics of the grain harvester herein shown are old and well known to those skilled in the art and the full description of such old features will not be required for an understanding of the invention.

The machine includes a well known grain supporting platform 1 upon which is mounted well known conveyer mechanism 2 for transferring the grain cut by the sickle mechanism 3 to the grain conveyer equipment 4, the grain being deposited by the usual means upon the conveyer 2 after it has been cut by the sickle 3.

The grain is discharged from the conveyer equipment 4 upon the inclined binder deck 5 along which the grain descends by gravity to the binding mechanism such descent being aided by the usual alternately operating packer arms 6. The binder deck 5 is provided with the usual cover 7 which acts to deflect grain upon the deck 5 which is forcibly carried beyond the plane of such deck by the conveyer. The usual hastening roller 8 is employed to aid the grain to bridge the gap (in the descent of the grain) intervening between the conveyer 4 and the deck 5. The grain is arrested in its descent by an arm 9 normally positioned in the path of the grain, this arm being maintained in this position until the packer arms 6 have packed sufficient grain against the arm 9 to occasion that degree of pressure which will cause the arm 9 to yield. When the arm 9 yields, as is well known by those skilled in the art, binding mechanism is set into operation for binding the bundle which has been accumulated against the arm 9, this binding operation being finished after the arm has been moved slightly away from its normal position, the arm 9 continuing its movement from its normal position to discharge the tied bundle. After the bundle has been tied it descends, such descent being aided by the discharge arms 10.

In accordance with my present invention the bundles are discharged within a loop of twine or string 11 and are supported by outsetting arms 12, 13 constituting an outsetting support for the deposited bundles. When the predetermined number of bundles has been accumulated all but one of these bundles are within the lower part of the loop and the last bundle is still pressing against the arm 9. This last bundle is tied substantially simultaneously with the tying of the ends of the loop string 11 about the six previously discharged bundles and about the bundle still pressing against the arm 9, the loop 11 and the bundles surrounded thereby being drawn, during the loop tying operation, substantially to the position indicated by the dotted line 11 in Fig. 1. The loop 11 is thus tightly tied about the seven bundles (or any other predetermined number of bundles) whereafter the twine or string leading to the loop is severed preparatory to forming another loop to bind a new shock of bundles. The tied shock of bundles is now free to be discharged from the shock support 12, 13 and in being discharged the section of this support comprising the fingers 13 is elevated in the plane of travel of the harvester to tip the shock with the butt ends of the grain upon the ground, the section of the support comprising the fingers 12 being withdrawn to permit of this dumping operation. After the shock has been tipped end on upon the ground the section of the support comprising the fingers 13 is rotated rearwardly out of the path of the standing shock whereafter the parts 12 and 13 are repositioned to receive the next shock.

The mechanism for tying knots in twine or string around the individual bundles is well known by those skilled in the art and will not be generally described. The power for operating the knotter is primarily supplied from a shaft 14 driven by a pinion 15 in mesh with a spur gear 16 rotating with one of the traction wheels 17. Power is communicated from the shaft 14 by suitable mechanism including shaft 19 and sprocket wheel 20 to drive the sprocket chain 21 and other parts of the harvester including the knotter. The chain 21 drives the sprocket wheel 22 that is in fixed relation to a spur gear 23 (the wheels 22 and 23 being upon the same shaft $23^1$) in mesh with an intermediate spur gear 24 that is in turn in mesh with a spur gear 25 upon the packer crank shaft 26 upon which the packers 6 are mounted whereby this shaft 26 is operated to apply the packers 6 alternately. The packers 6 are loose upon the shaft 26 and are connected at their lower ends by links 27 with an element 28 of the usual tripping mechanism that normally permits the arm 9 to remain in the position shown in Fig. 1 but which is caused to yield when the pressure afforded by the accumulated grain is increased to a sufficient extent whereupon the arm 9 is tripped. Further description of these features is not required as this particular mechanism is old and well known.

The shaft $23^1$ is connected by miter gearing 29 (Figs. 2 and 7) with shaft 30 which is connected by bevel gears 31, 32 with shaft 33. The gear 32 has crank connection at 34 with a pitman 35 which is connected at its lower end with a crank 36 fixed upon a shaft 37 upon which the needle 38 for tying the grain into bundles is fixedly mounted. The pitman 35 causes the shaft 37 and the needle 38 it carries to oscillate. This oscillation occurs, however, only when a bundle is to be bound, to which end the structure of my Patent 594,842, of December 7, 1897, may be adapted. The gear wheel 32 has its teeth discontinued at one portion as indicated in Fig. 8, that is, the gear 32 is mutilated at one portion of its periphery so as to be relieved of engagement with the gear 31 at this point. A cam 39 (Fig. 27) operates upon a cam roller 40 upon the outer end of a cam lever 41 fixed upon shaft 42, upon which shaft an arm 43 is also fixed, the outer end of this latter arm being in connection with a plunger rod 44 whose lower end is provided with a nut or enlargement 45 in compressing engagement with a spring 46. The frame 47 for the spring 46 is connected by means of a link 48 with a holding pawl 49 whose nose is receivable within a notched lug 50 fixed on the wheel 32. When the requisite amount of grain has been pressed against the compressor 9, a sufficient pressure has been exerted upon this compressor 9 by the packers 6 to depress the frame 47 against the pressure of the spring 46 sufficiently to cause the link 48 to withdraw the pawl 49 from engagement with the lug 50 whereupon the spring 46 will operate through the cam roller 40 and the cam 39 rapidly to turn the bevel gear 32 in the direction indicated by the arrow in Fig. 27 sufficiently to reëstablish engagement between this bevel gear and the bevel pinion 31 whereupon this bevel pinion 31 (which is constantly rotating) is effective to oscillate the shaft 37 and the needle 38 fixed upon the shaft. When the needle 38 is oscillated it passes twine about a bundle and presents the same to a knotter, all as is well understood by those skilled in the art and which will require no particular description.

The mechanism which imparts motion to the needle 38 for passing twine around the bundles also is adapted to transmit power to the needle 51, the same shaft 37 being preferably employed for this latter purpose, the needle 51 operating to pass twine around a collection of bundles to form the loop 11 as indicated in Fig. 1, it being understood that this loop is enlarged each time a bundle is inserted therein. The needle 51, however, is only to operate after the predetermined number of bundles has been received in the loop 11, on which account a clutch mechanism is employed that normally disconnects the needle 51 from the shaft 37 but which clutch mechanism is brought into play, when the shock is to be bound, which shock binding operation occurs when the last bundle that is to be included in the shock is being bound. In the example chosen the needle 38 operates six times (to bind six bundles) and the needle 51 operates in unison with the needle 38 in the seventh operation of the needle 38, when the shock is to be bound and tied with the seventh bundle. The clutch mechanism that may be employed for this purpose is illustrated in detail in Figs. 16, 17, 19 and 21, where the needle 51 is shown as being provided with an elongated hub 52 normally free of the shaft 37, it being understood that the shaft 37 is provided with suitable bearings such as those indicated at 53 and 54. The hub 52 is slotted to one side of the shaft 37 as indicated at 55 to permit a pin 56 to move back and forth transversely of the shaft 37, the clutch lever 57 fixedly carrying the guide pin 56. A spring 58 is housed within an extension of the hub 52 and presses upon the clutch lever 57 on one side of the shifting pin 56. One end of the clutch lever 57 carries a cam roller 58¹ adapted to be operated by a cam projection 59 to move the clutch lever 57 in a clockwise direction (Fig. 14) thereby to move the guide pin 56 forwardly in its slot 55, the end of the clutch lever 57 opposite the roller 58¹ then riding upon the lower surface of the hub 60 belonging to the needle 38. The range of operation of the needle is indicated in Fig. 17 between the full line and dotted line illustrations of the needle 38 and when the needle 38 brings the slot 61 into register with the clutch lever 57 at the time the pin 56 has been shifted forwardly such clutch lever 57 will drop into the hub slot 61 so that the next oscillating movement of the needle 38 is accompanied by a similar movement of the needle 51 in unison. After the clutch lever 57 has been dropped into the slot 61, the cam roller 58¹ rides upon the stationary cam 62 during the oscillating movement of the needle 51, the cam 62 having an arcual length sufficient to maintain the needles in couple during their simultaneous operation.

The cam 59 is to be effective to couple the needles 38 and 51 during each seventh operation of the needle 38. To this end there is provided a ratchet 63 (which also carries the cam 59) rotatably mounted upon the shaft 37, this ratchet having as many tooth notches 64 as there are bundles to be included in each shock. A pawl carrier 65 is fixed upon the shaft 37, there being a spring pressed pawl 66 supported by the carrier 65 and pressed toward the ratchet 63. The pawl carrier 65, being fixed upon the shaft 37, is oscillated with the needle 38 so as to turn the ratchet 63 one-seventh of a revolution for each complete oscillation of the needle 38, whereby, when the seventh oscillation of the needle 38 occurs the cams 59 and 62 coöperate in the manner which has been described to cause the needle 51 to be oscillated with the needle 38 in the seventh oscillation of the latter. If it should be desired to add a bundle to the shock the tooth space next in line with the pawl 66 should be covered as by means of a lip 67 carried upon the upper end of an arm 68 rotatably mounted upon and with respect to the shaft 37, this arm being provided with a slot 69 at its other end in which a spring 70 is disposed for the purpose of so positioning the arm 68 and the lip 67 as to render the latter normally ineffective. When the lip is to become effective for its purpose the arm 68 is moved in a clockwise direction against the force of the spring 70 for which purpose a string 71 may be attached to the arm 68.

A signal is preferably conveyed before the last bundle is bound so that the operator may, if he desires, manipulate the lip 67 to add one or more bundles to the shock before it is bound. The signal device may include a gong 72 to be impinged upon by a hammer 73 projecting from a pivoted support 74. The support 74 is provided with a tail piece 75 under which the cam 59 rides, the spring 76 striking the hammer 73 upon the gong 72 when the cam 59 has cleared the tail piece 75. The element 77 upon which the cam 62 is provided is preferably downwardly extended to rest upon a frame piece 78 whereby the shaft 37, which turns upon the part 77, is supported in part. The gong 72 is also mounted upon the element 77 and the guide stud 79 is also mounted upon the element 77 whereby the parts are held in proper relation.

The twine 11 is passed through the eye of the needle 51 and a loop is formed in this twine in position to receive bound bundles, the twine being drawn through the needle 51 as the bundles are supplied to the loop so that the loop will correspondingly enlarge as the bundles accumulate.

The needle 38 is provided with flanges 38¹, 38² to face the needle 51 and lie in its plane. The flange 38¹ terminates in a pocket 38³ that receives the penetrating end of the needle 51 and itself is a continuation of the penetrating needle 38. The penetrating end of the needle 38 serves to space off or separate the flowing grain into bundles. By collocating the penetrating ends of both needles the shocker needle 51 passes into the flowing grain just where the bundle needle passes into the flowing grain so that the shocker needle will not interfere with the division of the grain which the bundle needle effects. While I prefer to provide the hood or pocket 38³ for the penetrating end of the shocker needle, I do not wish to be limited to this construction. Both needles are arranged to pass through the opening $a$ (Figs. 3 and 12) in the breast plate $b$ that is normally rigidly supported. This breast plate supports the usual bundle twine holding mechanism of which are illustrated the cord holder $c$, and the cord holder shoe $d$, the bundle knotting hook $e$ being also shown clearly in Figs. 3, 11 and 12. The shocker twine carrier includes a twine holding slide $f$ which is pressed by a spring $g$ in one direction within a slide guide $h$. A cam roller $i$ operates within the groove of a cam $k$ the seventh approach of the cam $k$ toward the roller $i$, the roller $i$ being adjusted to enter the groove of the cam $k$ on this seventh stroke of such cam, the cam $k$ being rigid with respect to the discharge arms 10 and turning with the discharge arm around the axis of the shaft 33. The slide guide $h$ is journaled at $l$ to enable it to have an axis about which to turn that is indicated by a dot and dash line in Fig. 12. The shocker needle 51 is provided with a cam formation 51¹ that engages the roller $m$ mounted upon the link $n$ which in turn is journaled upon the breast plate $b$.

When the shocker needle passes through the opening $a$ its cam portion 51¹ engages the roller $m$ to raise the link $n$ which in turn raises the link $o$ that is connected at its lower end with the hook $p$ which is fixed on the shaft $q$. The lower end of the shaft $q$ is connected with one end of the crank $r$, the other end of this crank being connected by a link $s$ with the cord holder slide $h$. Thus, when the cam roller $m$ is raised by the rising shocker needle, the guide $h$ is turned upon its axis of movement illustrated by the dot and dash line in Fig. 12 whereby the roller $i$ is brought into alinement with the groove of the cam $k$ so that the cam $k$ may operate upon the roller $i$ to move the slide $f$ against the force of the spring $g$. The slide $f$ has a bayonet hook formation $f^1$ for receiving the shocker twine, the upper flange of the bayonet hook coöperating with the slide guide $h$ to hold the shocker twine depressed during the first six bundle tying operations, but when the seventh bundle tying operation is to occur the slide $f$ is pressed inwardly against the force of the spring $g$ in the manner which has been described whereby a portion $h^1$ of the slide guide $h$ will dislodge the shocker twine from the bayonet hook. That is, the slide $f$ constitutes a cord holder which holds the shocker twine during the time that six bundles are being tied but which releases the shocker twine when the seventh bundle is being tied. As a consequence of the release of the shocker twine, upon the inward movement of the slide $f$ against the spring $g$, the hook $p$ is free to place the shocker twine over the knotter hook $e$ as this shocker twine also passes over the hook $c^1$ of the bundle twine holder $c$, the bundle twine holder $c$ then operating upon the shocker twine and the bundle twine together and in coöperation with the knotting mechanism whereby the single knotting mechanism operates to tie the shocker twine and the bundle twine into the composite knot illustrated at $t$ in Fig. 10. A stationary stripper $p^1$ serves to strip the cord 11 off the hook $p$ when this hook places the twine upon the knotter hook $e$. After this composite knot has been formed the twine is severed by the usual twine severing mechanism whereafter the bundle and shocker cords are again positioned in their respective holders $c$ and $f$, the bundle twine holder $c$ thereafter solely operating as each of the next six successive bundles are formed and again jointly operating with the next seventh bundle in the manner which has been described.

The knotting and twine severing mechanism employed for tying the loop 11 and severing the twine is taken, in my machine, from the prior art which is exemplified in my Patent 567,932 and a detail description and illustration of such mechanism would therefore be superfluous herein. After the loop 11 has been tied about the shock the shock is next turned upon end to rest upon the ground, a result which is accomplished by turning forwardly the shaft 97 which supports the fingers 13 in a plane co-incident with the plane of travel of the machine, while at the same time the fingers 12 are individually turned inwardly, rearwardly and downwardly to lie parallel with the machine, this result being accomplished by turning the shaft 98 upon which a crank 99 is carried, a pitman 100 connecting this crank with a bar 101 which is reciprocated by the pitman 100 parallel to the direction of travel of the machine. Each finger 12 has crank connection at 102 with the bar 101, these cranks being journaled in the outer ends of brackets 103 and having connection at their upper ends with the slide 101. The portions of the brackets 103 carrying the crank ends of the fingers 12 are bifurcated, the lower branches of these brackets being slotted as indicated at 104 whereby the fingers 12 may rise to ride over obstructions upon the ground while the fingers are in their lowered positions. After the fingers 13 have tipped the shock 105 upon end, these fingers are rearwardly and inwardly turned to clear the standing shock, a result which is accomplished by turning the elevated shaft 97 upon its axis. After the shock has been cleared the shafts 97 and 98 return the fingers 12 and 13 to their horizontal laterally projecting positions ready to receive the bundles of a new shock. The mechanism by which the shafts 97 and 98 are controlled in their operation includes said shaft 98 passing through the hub 107 of the wheel 17 and co-axial with the wheel and its hub. Upon this shaft 98 is journaled a lever 108 pivoted co-axially with the shaft 14, this lever 108 carrying a locking lever 109 connected by a link 110 with the holding pawl 111 working over the teeth of a rack 112 also concentric with the shaft 14.

Incidentally it should be stated that by means of the lever 108 and the rack 112 the machine can be raised and lowered. The hub of the wheel 107 is fixed with respect to the sleeve 113, this sleeve being free to turn upon the sleeve 114 fixed with respect to the lever 108 and within which sleeve 114 the shaft 98 may turn. A clutch member 115 is in fixed relation to the sleeve 113 and the spur gear 16, the material relative endwise movement of the clutch member 115 and the wheel hub 107 with respect to the shaft 98 being prevented by collars 116. These characteristics are particularly shown in Figs. 1, 2, 4, 5, 6, 7, and 22. The clutch member companion to clutch member 115 includes a clutch roller 117 rotatably mounted upon a clutch roller support 118 pivoted at 119 upon a bracket 120 which is fixed upon the shaft 98 by a clamping U-shaped bolt 121. The clutch element 118 is turned upon its pivot 119 by the rotation of the shaft 122 which turns with but is slidable within the quill shaft 123. The shaft 122 is coupled with the clutch element 118 by a universal joint 124. The shaft 123 has fixedly attached thereto an arm 125 connected by a link 126 with an arm 127 fixed upon the quill shaft 128 within which the square end of the shaft 37¹ projects so that the shafts 37¹ and 128 are in telescoping engagement while rotating together.

Any suitable means may be employed for imparting movement from the hub 52 to the shaft 37¹, which shaft may turn with respect to the shaft 37. The preferred arrangement is fully illustrated in Figs. 16 and 19 where the shaft 37¹ has pin and slot connection 37² to prevent relative longitudinal movement of the shafts 37 and 37¹ but to permit the shaft 37¹ to turn with respect to the shaft 37. The hub 52 carries a bracket 37³ having a square hole at its outer end which snugly fits the shaft 37¹ whereby this shaft turns whenever hub 52 turns. When the needle 51 moves upwardly toward the knotter the shafts 37¹, 128, 123, and 122 are so turned as to throw the clutch roller 117 toward the clutch member 115. When the needle 51 is moving downwardly these shafts are so turned as to withdraw the roller 117 from the clutch member 115. Thus when the needle 51 is raised to take part in tying the twine about the shock the clutch elements 115 and 118 are coupled and the shaft 98 is turned to turn the shaft 97 in the plane of travel of the machine with the results previously described. At the same time the crank 99 upon the shaft 98 shifts the shock supporting fingers 12 rearwardly, inwardly and downwardly as hitherto described. When the needle 51 returns the clutch elements 115 and 117 are separated whereupon the spring 129 connected with the clutch element 118 by the link 130 operates to restore the shaft 98 to reposition the fingers 12 and 13 as indicated in Figs. 1, 2 and 7 to receive fresh bundles of a new shock. The fingers 12 and 13 are to be held in the withdrawn positions during the time that the first bundle of a new shock is being accumulated to which end I employ a holding pawl 131 pivotally mounted upon a stationary support 132 and adapted to be engaged at its upper end by a detent 133 carried upon the support 118, this engagement of the elements 131 and 133 occurring when the needle 51 starts to return.

The holding pawl 131 is provided with an elongated tail 134 (Fig. 23) which is connected by a link 135 with the crank 36 fixed upon the shaft 37 whereby the pawl 131 is positively moved in timed relation with the movement of the shaft 37. When the pawl 131 is released the spring 129 restores the clutch element 118 and the complemental parts of the shocking mechanism to their initial positions.

A roller 135¹ is carried upon the element 118 which is adapted to roll outwardly upon the cam 136 forming a continuation of the fixed portion 132, this rolling of the cam roller 135¹ upon the cam 136 occurring when the clutch elements 115 and 117 are being separated. The cam 136 thereby forces the detent 133 into engagement with the holding pawl 131 to hold the fingers 12 and 13 in their withdrawn position. During the time that the first bundle of the new shock is being assembled, that is while the fingers 12 and 13 are passing the shock that has been deposited upon the ground. After the deposited shock has been passed the holding pawl 131 is lifted as hitherto described upon the binding of the first bundle of the new shock. As a supplemental precaution, a guard plate 137 is carried by the support 132, this guard plate being of such areal length as to insure the maintenance of the engagement of the roller 117 with the clutch element 115 a proper interval of time. The surface 138 (Fig. 23) of the plate 137 takes part in directing the detent 133 into engagement with the holding pawl 131.

The shaft 97 turns upon an axially rotating shaft 139 mounted at its inner end upon the block 140 fixed upon the shaft 98, the hollow shaft 97 turning upon the shaft 139 and with this shaft when the shaft 98 turns. The spring 141 is anchored at one end upon the block 140 and at its other end upon the hollow shaft 97, the function of the spring 141 being to return the fingers 13 to their normal outsetting position for receiving fresh bundles. On the outer end of the shaft 139 is fixedly mounted a holding pawl 142 which serves to hold the latch 143 which is mounted to oscillate in a block 144 in turn fixedly mounted upon the hollow shaft 97. When the pawl 142 thus engages the latch 143 the shafts 97 and 139 are in fixed relation. Such engagement of the pawl and latch is effected when the shaft 98 is moved in a counter-clockwise direction to bring the shafts 97 and 139 horizontal. When the shaft 97 has been returned to its normal horizontal position (which happens while the first bundle of a new shock is being assembled) the chain 145 which connects the tail of the latch 143 with the frame of the machine, is slackened whereby the spring 141 is permitted to turn the shaft 97 in a manner to bring the pawl 142 in engagement with the latch 143, the latch and pawl being maintained in engagement until a new shock is to be deposited upon the ground, after which depositing action the latch and pawl are disengaged owing to the tightening of the chain 145 that will be followed by an oscillating movement of the latch 143 that will withdraw the latch from the pawl, this result occurring when the shaft 98 turns the shaft 97 in a clockwise direction. When the elements 142 and 143 are thus uncoupled, the chain 145 operates to turn the shaft 97 in a clockwise direction to withdraw the fingers 13 out of the way of the deposited shock, and in so doing the chain 145 places the spring 141 under increased tension so that this spring will operate to turn the shaft 97 in a counter-clockwise direction when the shaft 97 is being lowered to reposition the fingers 13 to receive the bundles in a new shock. To prevent the shafts 97 and 139 from dropping below the horizontal the shaft 139 is inturned at 146 to strike the horizontally supported motion limiting frame piece 147.

While I have herein shown and particularly described the preferred embodiment of my invention I do not wish to be limited to the precise details of construction shown as changes may readily be made without departing from the spirit of the invention.

Having thus described my invention I claim as new and desire to secure by Letters Patent the following:—

1. A grain harvester including mechanism for assembling grain into bundles; mechanism for tying twine about the bundles; mechanism for tying twine about a plurality of bundles to assemble the same into shocks, said tying mechanisms including a needle for tying bundles and a needle, contiguous to the first mentioned needle, for tying the bundles into shocks, and mechanism for operating the bundle needle a plurality of times for each operation of the shocker needle and for causing the points of both operating needles to operate in close approximation.

2. A grain harvester including mechanism for assembling grain into bundles; mechanism for tying twine about the bundles; mechanism for tying twine about a plurality of bundles to assemble the same into shocks, said tying mechanism including a needle for tying bundles and a needle contiguous to the first mentioned needle, for tying the bundles into shocks; and mechanism for causing the points of both operating needles to operate in close approximation.

3. A grain harvester including mechanism for assembling grain into bundles; mechanism for tying twine about the bundles; mechanism for tying twine about a plurality of bundles to assemble the same into shocks, said tying mechanisms including a needle for tying bundles and a needle, contiguous to the first mentioned needle for tying the bundles into shocks and mechanism for operating the bundle needle a plurality of times for each operation of the shocker needle, the bundle needle having its penetrating end formed to overlie the penetrating end of the shocker needle.

4. A grain harvester including mechanism for assembling grain into bundles; mechanism for tying twine about the bundles; and mechanism for tying twine about a plurality of bundles to assemble the same into shocks, said tying mechanisms including a needle for tying bundles and a needle, contiguous to the first mentioned needle for tying the bundles into shocks, the bundle needle having its penetrating end formed to overlie the penetrating end of the shocker needle.

5. A grain harvester including mechanism for assembling grain into bundles; mechanism for tying twine about the bundles;

mechanism for tying twine about a plurality of bundles to assemble the same into shocks, said tying mechanisms including a needle for tying bundles and a needle for tying the bundles into shocks; mechanism for operating the bundle needle a plurality of times for each operation of the shocker needle; a knotting mechanism common to both needles and serving in coöperation therewith to tie knots upon the bundles and shock; and mechanism for causing the points of both operating needles to operate in close approximation.

6. A grain harvester including mechanism for assembling grain into bundles; mechanism for tying twine about the bundles; mechanism for tying twine about a plurality of bundles to assemble the same into shocks, said tying mechanisms including a needle for tying bundles and a needle for tying the bundles into shocks; a knotting mechanism common to both needles and serving in coöperation therewith to tie knots upon the bundles and shock; and mechanism for causing the points of both operating needles to operate in close approximation.

7. A grain harvester including mechanism for assembling grain into bundles; mechanism for tying twine about the bundles; mechanism for tying twine about a plurality of bundles to assemble the same into shocks, said tying mechanisms including a needle for tying bundles and a needle for tying the bundles into shocks; mechanism for operating the bundle needle a plurality of times for each operation of the shocker needle, the bundle needle having its penetrating end formed to overlie the penetrating end of the shocker needle; and a knotting mechanism common to both needles and serving in coöperation therewith to tie knots upon the bundles and shock.

8. A grain harvester including mechanism for assembling grain into bundles; mechanism for tying twine about the bundles; mechanism for tying twine about a plurality of bundles to assemble the same into shocks, said tying mechanisms including a needle for tying bundles and a needle for tying the bundles into shocks, the bundle needle having its penetrating end formed to overlie the penetrating end of the shocker needle; and a knotting mechanism common to both needles and serving in coöperation therewith to tie knots upon the bundles and shock.

9. A grain harvester including mechanism for assembling grain into bundles; mechanism for tying twine about the bundles; mechanism for tying twine about a plurality of bundles to assemble the same into shocks, said tying mechanisms including a needle for tying bundles and a needle for tying the bundles into shocks; and mechanism for operating the bundle needle a plurality of times for each operation of the shocker needle, said tying mechanisms having a knotter common to the needles.

10. A grain harvester including mechanism for assembling grain into bundles; mechanism for tying twine about the bundles; and mechanism for tying twine about a plurality of bundles to assemble the same into shocks, said tying mechanisms including a needle for tying bundles, a needle for tying the bundles into shocks, and a knotter common to the needles.

11. A grain harvester including mechanism for assembling grain into bundles; mechanism for tying twine about the bundles; mechanism for tying twine about a plurality of bundles to assemble the same into shocks, said tying mechanisms including a needle for tying bundles and a needle for tying the bundles into shocks; mechanism for operating the bundle needle a plurality of times for each operation of the shocker needle, said tying mechanisms having a knotter common to the needles; and mechanism for causing the points of both operating needles to operate in close approximation.

12. A grain harvester including mechanism for assembling grain into bundles; mechanism for tying twine about the bundles; mechanism for tying twine about a plurality of bundles to assemble the same into shocks, said tying mechanisms including a needle for tying bundles, a needle for tying the bundles into shocks, and a knotter common to the needles; and mechanism for causing the points of both operating needles to operate in close approximation.

In witness whereof, I hereunto subscribe my name this 17th day of September A. D. 1914.

JOHN F. APPLEBY.

Witnesses:
G. L. CROGG,
ETTA L. WHITE.